(12) United States Patent
Clement et al.

(10) Patent No.: US 8,745,375 B2
(45) Date of Patent: Jun. 3, 2014

(54) HANDLING OF THE USAGE OF SOFTWARE IN A DISCONNECTED COMPUTING ENVIRONMENT

(75) Inventors: Jean-Yves Clement, Saint Jeannet (FR); Olivier Y. D. De Lampugnani, Cagnes sur mer (FR); Gerard Graffagnino, Nice (FR); Benjamin Lafois, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 12/941,935

(22) Filed: Nov. 8, 2010

(65) Prior Publication Data
US 2011/0145568 A1   Jun. 16, 2011

(30) Foreign Application Priority Data
Dec. 14, 2009  (EP) .................................... 09306224

(51) Int. Cl.
*G06F 21/00* (2013.01)
*G06F 21/10* (2013.01)
(52) U.S. Cl.
CPC ..................................... *G06F 21/10* (2013.01)
USPC ......................................................... 713/156
(58) Field of Classification Search
CPC ....................................................... G06F 21/10
USPC ......................................................... 713/156
See application file for complete search history.

(56) References Cited

U.S. PATENT DOCUMENTS

| | | | |
|---|---|---|---|
| 5,136,643 A * | 8/1992 | Fischer | 713/178 |
| 7,191,155 B2 * | 3/2007 | Maruyama et al. | 705/59 |
| 7,366,900 B2 | 4/2008 | Shambroom | |
| 7,418,736 B2 | 8/2008 | Ghanea-Hercock | |
| 2005/0081029 A1 | 4/2005 | Thornton et al. | |
| 2006/0080352 A1 | 4/2006 | Boubez et al. | |
| 2006/0085634 A1 * | 4/2006 | Jain et al. | 713/156 |
| 2008/0244754 A1 | 10/2008 | Curren | |
| 2011/0145568 A1 * | 6/2011 | Clement et al. | 713/156 |

FOREIGN PATENT DOCUMENTS

WO   WO2009065154   5/2009

OTHER PUBLICATIONS

ETSI, ETSI TS 123 057, Sep. 2000, european telecommunication standards institute, V3.3.0, pp. 1-60.*
Public Key Certificate, Nov. 15, 2008, Wikipedia, pp. 1-3.*

* cited by examiner

*Primary Examiner* — Hadi Armouche
*Assistant Examiner* — Dao Ho
(74) *Attorney, Agent, or Firm* — Law Offices of Ira D. Blecker, P.C.

(57) ABSTRACT

A method, computer program product and system of handling usage of software in a disconnected computing environment. A digital certificate including time frame constraints is generated, signed by a certificate authority and associated to the software. To be executed, the digital certificate previously signed must be validated by the certificate authority by checking public keys and the time frame constraints must be simultaneously satisfied in the disconnected computing environment. The use of software is controlled in disconnected computing environments and/or read-only computing environments, i.e. environments which are not modifiable or in which brought modifications are not persistent. The data collected by the software may be further encrypted and thus be controlled.

15 Claims, 4 Drawing Sheets

HANDLING OF THE USAGE OF SOFTWARE IN A DISCONNECTED COMPUTING ENVIRONMENT

FIELD OF THE INVENTION

The present invention relates generally to data processing and more particularly to the handling of the usage of software in a disconnected computing environment.

BACKGROUND

Existing methods and systems to protect software against unauthorized use leverage approaches such as (A) check a key validity online, by Internet or a network connection or (B) write some hidden flags on a machine (registry, file system, etc) to save the first use, and limit to a predetermined number of days the usage (sharewares).

These existing methods are not necessarily usable on particular systems. Some computing environments indeed can not be modified and are "read-only". Other computing environments are disconnected computing environments, i.e. with no network access (by nature or due to availability or security reasons). For example, read-only file systems on embedded appliance or live-CD systems cannot be modified. Or when the system powers off, any kind of modification is canceled or undone at the next start-up. This makes existing mechanisms inefficient. In some particular business computing environments (sensitive systems for instance), there is a need to run some software which must not modify anything in the running computing environment and/or which cannot rely on network connections.

BRIEF SUMMARY

There are provided exemplary embodiments including a method of handling usage of a software in a disconnected computing environment, a computer program product and a system.

It is disclosed a method and system of handling usage of a software in a disconnected computing environment, the method including: generating by a computer processor a digital certificate including time frame constraints; signing by a computer processor the digital certificate by a certificate authority; associating by a computer processor the signed digital certificate to the software; and executing by a computer processor the software when the signed digital certificate is signed by the certificate authority and when the time frame constraints are satisfied in the disconnected computing environment. In other words, the digital certificate is validated and at the same time other conditions are verified. It is for example verified that the certificate authority is the right one among a plurality, if any. A standard comparison between objects is performed (here between public keys; to provide an image, the public key which has been "stamped" in the software is compared with the "official" public key of the certificate authority). Some embodiments of the invention thus relate to the combination of a date and a digital certificate; variations and improvements of this process are described herewith.

The invention includes protecting a software, or an application or a functionality thereof, against unauthorized uses within predefined time frames. In other words, it enables control of the usage of the software. More generally, it is a method, computer program product and system of handling usage of software.

An advantage of the invention is to handle disconnected computing environments and/or read-only computing environments.

An advantage is indeed to provide control over the software, control which is rendered possible in computing environments which are not modifiable (this corresponds to "read-only" environments) or in which modifications are not persistent (as in stateless environments).

More precisely, a "read-only" computing environment designates a computing system which is not modifiable or in which brought modifications are not persistent (from one session to another for example). Such "read-only" systems relate to Live-CD, virtual machines or sandbox systems for example. The term "read-only" also addresses the case of a production system which cannot be modified or which must remain in the same state before and after the execution of the considered software, for example, for production constraints or reasons; in this latter case, it may be possible to read/write in the filesystem but no persistent modifications and/or logs and/or traces are allowed. In this sense, the properties of the computing environment on which the software executes are much broader than "read-only" properties; said properties relate to "non-persistent" or "stateless" or "temporary" properties. Yet in a preferred embodiment, the computing environment is "read-only".

Many combinations are possible: a read-only environment may be connected (with network connectivity) or disconnected, while a read/write environment may be connected or disconnected too. The invention addresses these different possibilities.

An advantage of the invention is to enable a control of the usage of an application in a specified time frame. A guarantee is granted to the editor that its software will not be used before the predefined beginning date, or after its expiration date.

An advantage of the invention is to enable the identification of the source of a data leak, if any. If there is a data leak, the source of the data leak may be easy to identify: the user identifier may indeed be hard-coded in the software or in the digital certificate and following associated with the leaked data.

An advantage of the invention further stems from an implementation option. The term "hard-coded" signifies that information is inserted in instructions of the program or software, for example, in lines of code. Said information corresponds to the information related to the digital certificate or to any other information, such as the user information for example. This hard-coding option may also be complemented by obfuscation techniques such as hardening of the software code to impede or render difficult the reverse engineering, if any.

The association between the digital certificate and the considered software can be dynamic or static. The association term may designate the step of establishing a link, of adding cross-references or of defining a correspondence. Embodiments wherein the digital certificate is a tile enable possible modifications and handling operations, brought independently to the software or to the digital certificate; whereas embodiments wherein the digital certificate is hard-coded in the software present other advantages such as a better portability or management or even security in certain cases.

A further advantage of the invention is that it then prevents illegal or unacceptable or unauthorized usage of the software.

A further advantage of the invention is that it offers a possibility of data encryption. Data may be deciphered only by the software distributor or issuer or publisher or provider or deliverer. It may for example be very useful in cases wherein software collects sensitive data on a given computing environment, and this collected data require further processing by the software deliverer. In such a case, if data is lost (portable media or Internet), these data will not be usable by any other party.

Further advantages of the invention will become clear to the skilled person upon examination of the drawings and detailed description. It is intended that any additional advantages be incorporated therein.

BRIEF DESCRIPTION OF THE SEVERAL VIEWS OF THE DRAWINGS

Exemplary embodiments of the invention will now be described with reference to the following drawings, in which.

DETAILED DESCRIPTION

To facilitate description, any numeral identifying an element in one Figure will represent the same element in any other Figure.

While the systems and methods are illustrated by use of clients and servers, they are equally applicable to virtually any computing environments, such as portable, wearable or mobile devices. The disclosure leverages asymmetric key pairs. In the description, a public key serves only to encrypt, and a private key serves to both encrypt, decrypt and to sign data, or certificates. Any variation of encryption technique is also possible and intended to be incorporated herewith.

The term "certificate" always relates to a digital certificate. The terms "distributor", "provider", "publisher", "deliverer" and "issuer" are related to the certificate authority and/or the software editor and may be equivalent since the certificate authority and the software distributor may correspond to the same party or to different parties, possibly linked by an agreement. The description thus intends to cover all different and possible combinations and/or roles.

Figure 1:
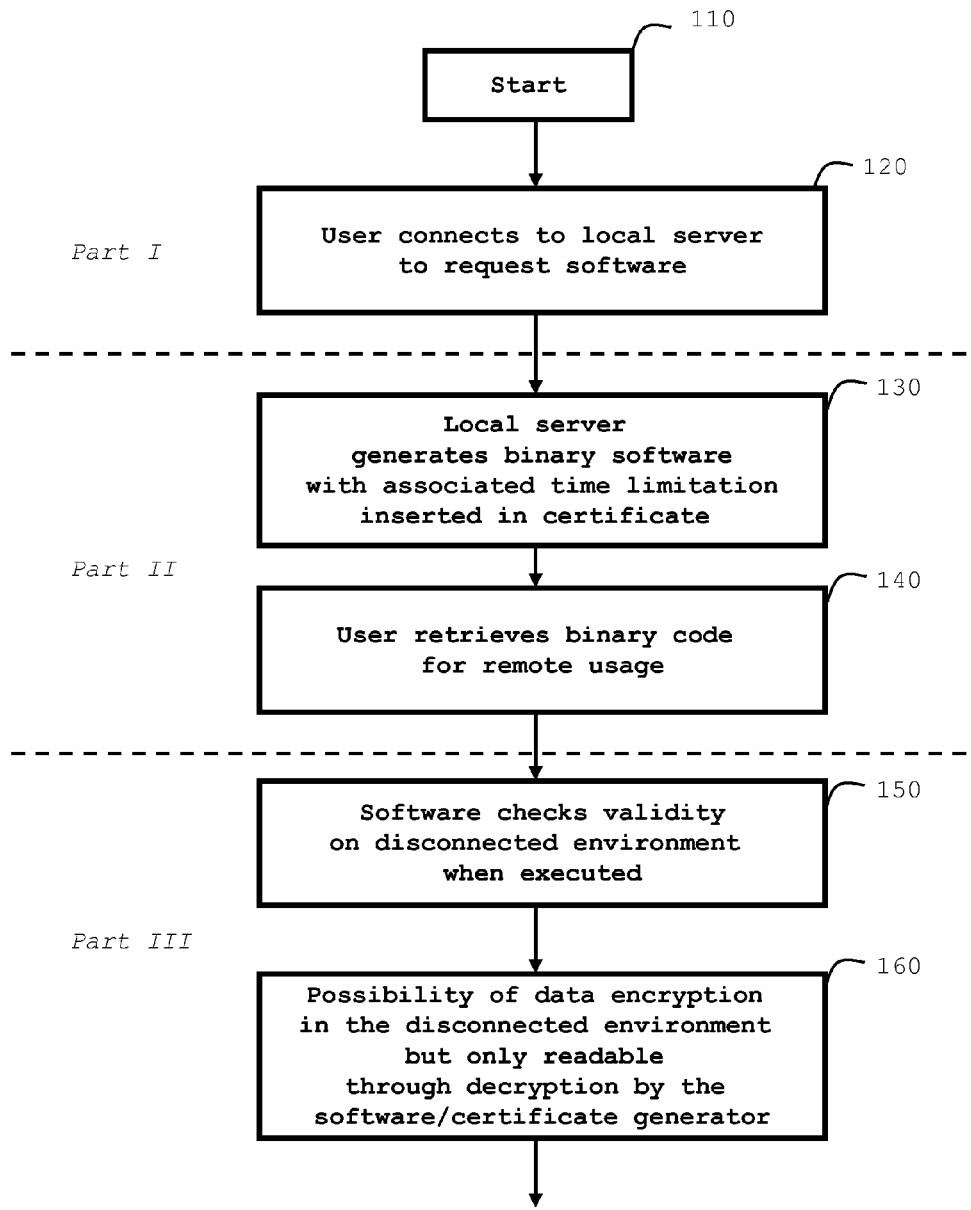
FIG. 1 shows certain principles of some embodiments of the method.

Referring to FIG. 1, there are shown principles of embodiments of the method.

Part I corresponds to the user request: a user wants to use the software, and he makes a request to the distributor. Alternatively, the software distributor may propose the software directly to the user, i.e., without an expressed request.

The box 110 called "Start" corresponds to the step of a user initiating a request, because the user needs to access the protected software. The box 120 illustrates this user action. A request of a copy of the protected software is made. The user expresses a request to use the software, and provides some information to the software publisher: a unique identifier, his name, some personal information (if wanted by the publisher), and desired time frame of exploitation for the software copy. Requesting means can be or involve a web portal or an email, or any human action.

Part II illustrates certain actions which occur on the software-publisher side. By accepting the request, the provider of the software generates a unique package for this unique user. The unique user identifier is encoded in a digital certificate, with the desired time frame, and all this information is signed in an electronic certificate. The software, which is pre-built, is prepared for accepting only certificates delivered by the considered provider/issuer/certificate authority. This is shown at step 130. In other words, based on information provided by the user at step 120, the software publisher is able to generate a customized package for this unique user, including a time limitation or time frame constraints and unique identifier. For further information, refer to FIG. 3. The user-customized package is provided to the customer at step 140. Step 140 describes the fact that after package generation by the software publisher, the user needs to retrieve it. It can be retrieved online, for example, by a web server or an email, etc. or by portable media means such as CDROM or USB key etc. It may also be directly packaged in an embedded environment.

Part III shows the usage of the software, and the new features provided by the disclosed mechanism. At step 150 is shown the "self-verification" part of the protected software. The delivered software may now check its validity each time it is run or executed. For further information, refer to FIG. 2. This box is about software execution in a disconnected computing environment such as "island" mode.

The box 160 relates to an additional feature which is optional and allows the protected software to produce encrypted data, only readable by the software publisher. This option enables the emergence of new business models such as by allowing software publishers to give software for free such (on the web for instance) while the further data processing of the collected data will be reserved to the publisher. No party other than the publisher will be able to exploit the collected data. Certain embodiments of the invention provide the possibility of encrypting data with the issuer public key; it will render the data exclusively decryptable by the software publisher. For example, it may be very useful in cases wherein sensitive data is collected in/on a certain computing environment and wherein this data require further processing by the software publisher. In that such case, if data is lost, for example, by loss of portable media or on the Internet, these data will not be usable by anybody.

As an example of implementation, consider software which checks the computer environment conformity with predefined security requirements. This software must collect some data which can be very sensitive (list of accounts, file system structure, specific configuration, etc). This software may have a processing part that generates compliance reports. According to the disclosed protection mechanism, the protected software is delivered to the user or customer. It collects or extracts data from the computing environment of said user or customer, and encrypts a set of collected data. The encrypted data is then sent back to the software publisher, and said software publisher processes this data. The software publisher generates the compliance report and sends it back to the customer.

As an overview, at runtime, the software checks, without any network connection if applicable, that the embedded certificate has been delivered by the appropriate certificate authority or distributor or issuer. It then checks that the current time corresponds to an authorized time frame. If not, the software will not start.

Figure 2:
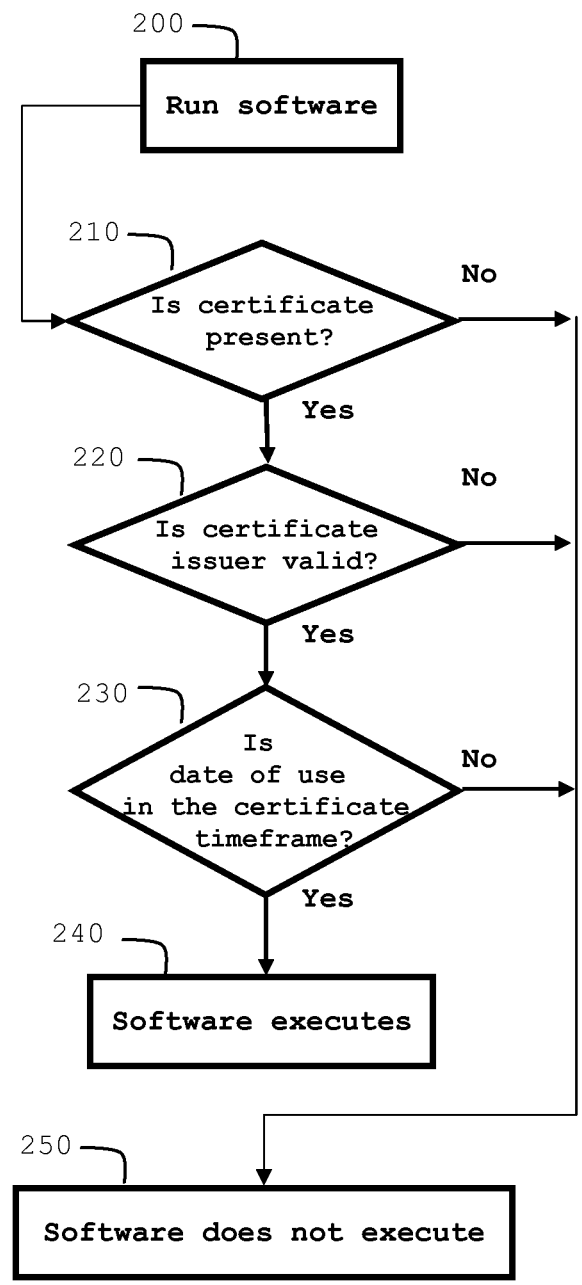
FIG. 2 details the execution of the delivered software which is protected according to embodiments of the invention.

Referring now to FIG. 2, FIG. 2 details the execution of the delivered software which is protected according to embodiments of the invention.

At step 200, the user is executing the software.

At step 210, when the software starts, a first check is made to verify that the certificate is present in the package. It may be a separate certificate file, but it also can be integrated or incorporated in the software binary code. If the certificate is present, the method continues to step 220, else if the certificate can not be found, software execution stops, step 250. Details on the certificate build-process are available in FIG. 3, step 320.

At step 220, a second verification relates to the issuer of the certificate found at step 210. This means it is verified that the digital certificate has been signed by the required certificate authority of the software issuer. To determine if the certificate authority is the valid or correct one, some information about the certificate authority (public key) is hardcoded in the binary software. A comparison is made between the public key (it has been built for) and the public key contained in the client certificate issuer field: this corresponds to an expression such as "validating (or not) the digital certificate". Details on certificate build-process are available on FIG. 3, step 320. If the found public key of certificate authority is satisfying, software execution continues to step 230, else, execution stops at step 250. In more details, the second step is the verification of the certificate issuer. The issuer is identified by its public key, called the certificate authority public key.

In the certificate, at least 2 keys are present: (a) the certificate Authority Public Key; the user Certificate Private Key (it is optional, depending on the implementation of the certificate); and (b) the user Certificate Public Key. This user certificate is signed; it means it could only be generated by the certificate authority. The software knows the allowed public key of the certificate authority (see FIG. 3); the software is stamped—at or during—its packaging to run only for the specified certificate authority. The public key is thus stamped or even hard-coded in the software. The software is provided with means for comparing the user-certificate provided certificate authority public key, with the embedded stamped certificate authority public key. If the considered comparison does not match, the execution of the software stops.

At step 230, there is handled a final or last verification before allowing software execution. This is the last protection functionality, namely the time frame limitation. Before starting or upon startup, it is checked that the date, and possibly also the time, of the computing environment on which is running the software is between the activation date (start date) and the expiration date (end date) of the time frame. If the date is satisfying, software real execution can start at step 240, else, execution stops at step 250. In other words, the software compares the actual time with the time frame provided in the certificate, and lithe actual time is valid in the time frame, the execution can start, else, execution stops. The satisfaction of the time frame constraints can be assessed by using several means, including verification against a clock associated with the disconnected computing environment on which the considered software runs. A timer or a scheduling method or system may also be used (optionally internal).

Step 240 shows the normal software execution, after validation of previously described conditions.

Figure 3:
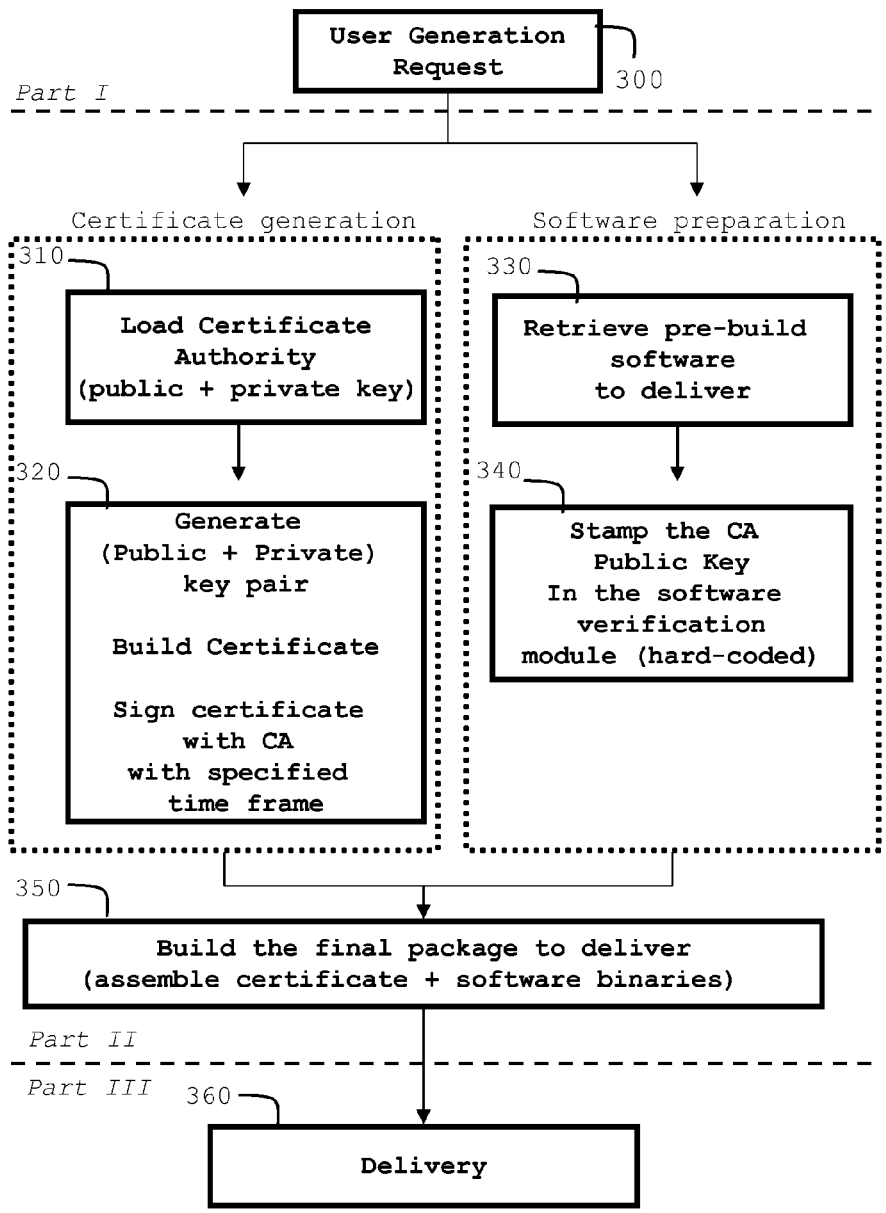
FIG. 3 details the process of packaging the software with the generated certificate.

Referring to FIG. 3, there is detailed the process of packaging the software with the user-generated certificate.

Part I relates to user-side actions. The box 300 called "Start" is the user action. Because the user needs to access the protected software, the user will initiate a request.

Part II includes actions performed on the software-publisher side. Two parallel steps or actions are required to allow the step 350. Steps 310 and 320 correspond to the generation of the certificate. At step 310, elements which are required are collected to generate and sign a new user-certificate. It supposes that an existing and valid certificate authority has already been issued to the software publisher. This certificate authority is then loaded on the building environment which will in turn generate the copy-protected software, including the protected private key, because it will be necessary to sign the user-certificate at step 320.

At step 320, a unique user-certificate is generated per software request, including a new public key and its associated private key. Information from the end-user is requested. A user-certificate is then built with said information such as user identity and information such as name or email and whatever information desired by the software publisher, in addition to the activation time and the expiration time information. The generated user-certificate is signed by the previously loaded certificate authority.

Steps 330 and 340 show the software preparation. At step 330, the original non-protected software is imported into the building environment in a pre-build release, but prepared for this software protection using a library for instance. At step 340, the pre-build software imported at step 330 is stamped. In other words, the software publisher (digital) certificate authority (CA) public key is hard-coded in the software before final building. The public key is written in a dedicated location of the software in the protection library part.

At step 350, using the output of steps 320 and 340, the final software which will be delivered can be packaged, with the binaries previously prepared and with the generated user-certificate. The packaging technology of course depends on environments.

Part III is the environment of the final user. At step 360, the software is delivered to the customer by any traditional way: online (website, ftp, mail . . . ) or portable media (cdrom, USB key, tape . . . ) or embedded environments.

Figure 4:
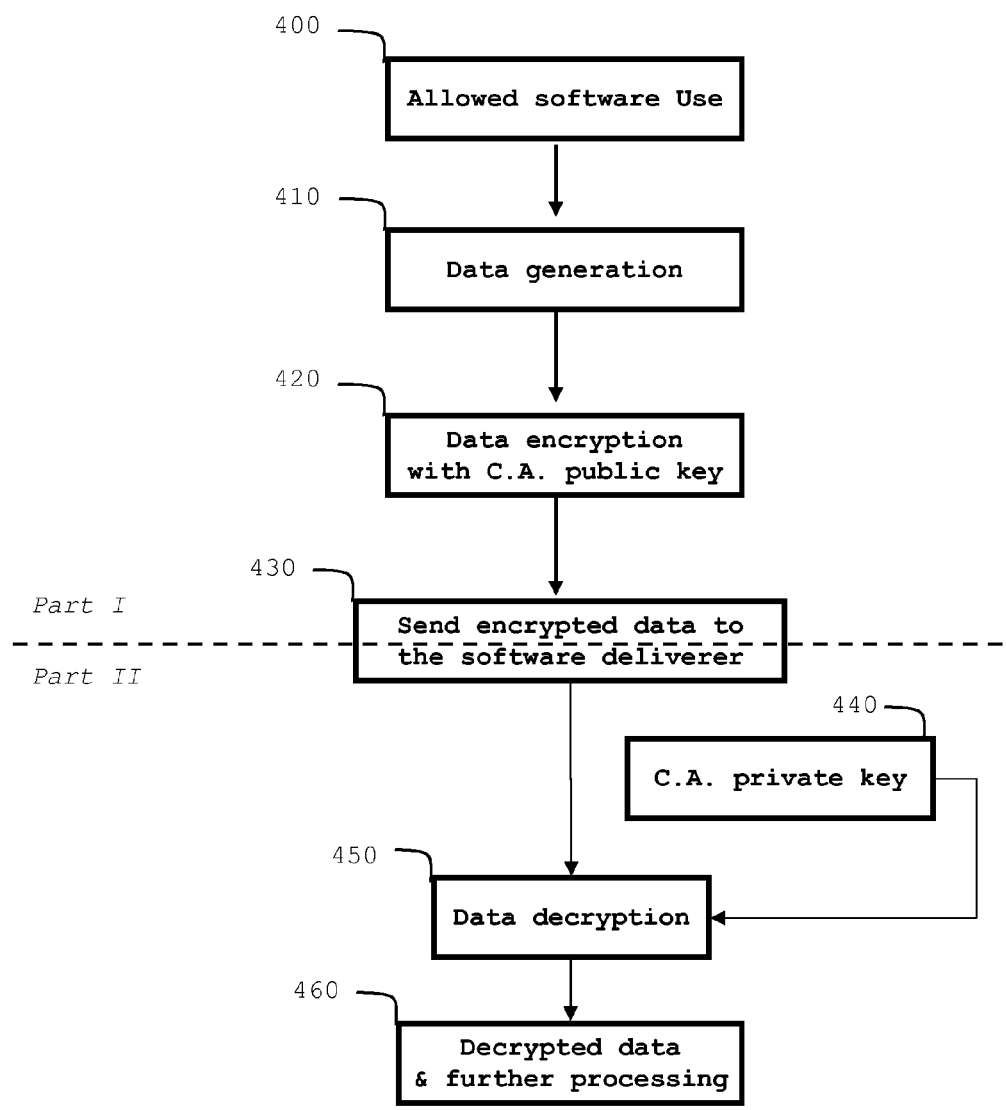
FIG. 4 illustrates the optional data output encryption.

In conclusion, with a valid certificate authority and a prebuilt binaries of the software to protect, the software deliverer platform will (a) generate a user certificate by i) writing Authorized User ID, ii) specifying a validity time frame and iii) signing all the information; (b) hard-code in the software to protect the public key of the certificate authority used for the certificate generation; and (c) package the certificate with the software for delivery Referring now to FIG. 4, there is illustrated the optional data output encryption.

Part I relates to software execution and data encryption, at the user side. Step 400 corresponds to the prerequisite of the software execution being allowed and successful as described in FIG. 2 step 240. At step 410, the protected-software produces data as output. Any type of data is supported. At step 420, using the public key of the certificate authority which delivered the certificate and the software, data output from step 410 is encrypted. At step 430, the encrypted data output from the step 420 is sent to the software publisher, using any kind of communication: online (web, ftp, mail) or portable media (CDROM, USB key . . . ) or return of embedded environment.

Part II relates to data exploitation and data decryption, on the software-publisher side. At step 440, the certificate authority private key is received, which is the only key that can decrypt data which has been encrypted by the corresponding public key. Step 450 shows the data decryption, using the private key loaded at step 440 and the data to decrypt received from step 430. At step 460, using the decrypted data issued at step 450, the software-publisher can exploit the data (handle analysis, produce reports etc).

The encryption of the data produced by the software protected according to embodiments of the invention is optional but valuable for several reasons.

It may help protect against loss or leaks of data. It may also protect against unauthorized use of the software, as produced data can only be decrypted by the software issuer. Said software issuer can be in the exclusive position of handling further processing on the data.

Using asymmetric keys, data can be encrypted using the certificate authority public key contained in the delivered software package, and be only decrypted by the software issuer (which is the only owner of the required private key required and able to decrypt data).

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computers have different structure or include equivalent units; in any case, it is possible to replace the computers with any code execution entity such as a PDA, a mobile phone, and the like.

Similar considerations apply if the program, which may be used to implement each embodiment of the invention, is structured in a different way, or if additional modules or functions are provided; likewise, the memory structures may be of other types, or may be replaced with equivalent entities, not necessarily consisting of physical storage media. Moreover, the proposed solution lends itself to be implemented with an equivalent method having similar or additional steps, even in a different order. In any case, the program may take any form suitable to be used by or in connection with any data processing system, such as external or resident software, firmware, or microcode, either in object code or in source code.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In any case, the solution according to the present invention lends itself to be carried out with a hardware structure, for example, integrated in a chip of semiconductor material, or with a combination of software and hardware.

Aspects of the present invention may be embodied as a system, method or computer program product. The invention can thus take the form of an entirely hardware embodiment, an entirely software embodiment or an embodiment containing both hardware and software elements. In a preferred embodiment, the invention is implemented in software, which includes but is not limited to firmware, resident software, microcode, etc. In a high performance system, a hardware implementation of the virtualization mechanism bundled with image generation processing may prove advantageous for example.

Furthermore, aspects of the present invention can take the form of a computer program product embodied in one or more computer readable medium(s) having computer readable program code embodied thereon.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

We claim:

1. A method of handling usage of software in a disconnected computing environment, said method comprising:
   generating by a computer processor a digital certificate comprising date and time frame constraints;
   signing by a computer processor the digital certificate by a certificate authority, the digital certificate including a first certificate authority public key;
   associating by a computer processor said signed digital certificate to said software;
   embedding by a computer processor a second certificate authority public key in the software, wherein embedding the second certificate authority public key further comprises hard-coding said second certificate authority public key in said software; and
   executing by a computer processor in the disconnected computing environment said software when said signed digital certificate is signed by said certificate authority, when said first certificate authority public key matches said second certificate authority public key and when said date and time frame constraints are satisfied in the disconnected computing environment.

2. The method of claim 1 wherein said digital certificate further comprises user identification information and wherein executing said software further comprises validating said user identification.

3. The method of claim 1 wherein executing said software further comprises collecting data in the disconnected computing environment.

4. The method of claim 3 further comprising encrypting the collected data using the first certificate authority public key or the second certificate authority public key.

5. The method of claim 4 further comprising decrypting the collected data using a private key of said certificate authority.

6. The method claim 1, wherein the digital certificate is an X509 digital certificate.

7. The method claim 1 wherein the computer system is read-only.

8. A computer program product for handling usage of software in a disconnected computing environment, the computer program product comprising:
   a non-transitory computer readable storage medium having computer readable program code embodied therewith, the computer readable program code comprising:
   computer readable program code configured to generate a digital certificate comprising date and time frame constraints;
   computer readable program code configured to sign the digital certificate by a certificate authority, the digital certificate including a first certificate authority public key;
   computer readable program code configured to associate said signed digital certificate to said software;
   computer readable program code configured to embed a second certificate authority public key in the software, wherein computer readable program code configured to embed the second certificate authority public key further comprises computer readable program code configured to hard-code said second certificate authority public key in said software; and
   computer readable program code configured to execute in the disconnected computing environment said software when said signed digital certificate is signed by said certificate authority, when said first certificate authority public key matches the second certificate authority public key and when said date and time frame constraints are satisfied in the disconnected computing environment.

9. The computer program product of claim 8 wherein said digital certificate further comprises user identification information and wherein computer readable program code configured to execute said software further comprises computer readable program code configured to validate said user identification.

10. The computer program product of claim 8 wherein computer readable program code configured to execute said software further comprises computer readable program code configured to collect data in the disconnected computing environment.

11. The computer program product of claim 10 further comprising computer readable program code configured to encrypt the collected data using the first certificate authority public key or the second certificate authority public key.

12. The computer program product of claim 11 further comprising computer readable program code configured to decrypt the collected data using a private key of said certificate authority.

13. The computer program product of claim 8, wherein the digital certificate is an X509 digital certificate.

14. A system including a non-transitory computer readable storage medium, the non-transitory computer readable storage medium having program code stored thereon for handling usage of software in a disconnected computing environment, the program code comprising:
   program code for generating a digital certificate comprising date and time frame constraints;
   program code for signing the digital certificate by a certificate authority, the digital certificate including a first certificate authority public key;
   program code for associating said signed digital certificate to said software;
   program code for embedding a second certificate authority public key in the software, wherein program code for embedding the second certificate authority public key further comprises program code for hard-coding said second certificate authority public key in said software; and
   program code for executing in the disconnected computing environment said software when said signed digital certificate is signed by said certificate authority, when said first certificate authority public key matches said second certificate authority public key and when said date and time frame constraints are satisfied in the disconnected computing environment; and
   a computer processor for executing the program code.

15. The system of claim 14 wherein program code for executing said software further comprises program code for collecting data in the disconnected computing environment and program code for encrypting the collected data using a public key of said certificate authority.

* * * * *